US012782122B2

(12) United States Patent
Iijima et al.

(10) Patent No.: US 12,782,122 B2
(45) Date of Patent: Nov. 3, 2026

(54) THREE-DIMENSIONAL SHAPE MEASUREMENT APPARATUS AND MEASUREMENT METHOD, AND NON-TRANSITORY COMPUTER-READABLE RECORDING MEDIUM

(71) Applicant: Konica Minolta, Inc., Tokyo (JP)

(72) Inventors: Masayuki Iijima, Okazaki (JP); Sotaro Yokota, Fuchu (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/987,842

(22) Filed: Dec. 19, 2024

(65) Prior Publication Data

US 2025/0231022 A1 Jul. 17, 2025

(30) Foreign Application Priority Data

Jan. 15, 2024 (JP) ................................ 2024-003795

(51) Int. Cl.
*G06T 7/521* (2017.01)
*G01B 11/25* (2006.01)

(52) U.S. Cl.
CPC ............ *G01B 11/254* (2013.01); *G06T 7/521* (2017.01)

(58) Field of Classification Search
CPC .................................................... G01B 11/254
USPC .......................................................... 348/136
See application file for complete search history.

(56) References Cited

U.S. PATENT DOCUMENTS 3,729,252 A * 4/1973 Nelson ................... G02B 27/46 385/119
5,835,218 A * 11/1998 Harding ............. G01B 11/2441 250/237 G
6,611,343 B1 * 8/2003 Frankowski ........... G01B 11/25 356/601
8,224,064 B1 * 7/2012 Hassebrook ......... G06V 10/145 356/3
10,209,202 B1 * 2/2019 Sullivan ............. G01N 21/8806
2003/0223083 A1 * 12/2003 Geng ................... H04R 25/658 356/603
2007/0263903 A1 * 11/2007 St. Hilaire ............. G06T 7/593 382/106

(Continued)

FOREIGN PATENT DOCUMENTS

JP 2013-88261 A 5/2013
JP 2016-31284 A 3/2016

(Continued)

*Primary Examiner* — Leron Beck
(74) *Attorney, Agent, or Firm* — Osha Bergman Watanabe & Burton LLP

(57) ABSTRACT

A three-dimensional shape measurement apparatus includes a projector that includes a projector lens and projects a stripe pattern, a camera that includes a camera lens and captures an image of the stripe pattern projected by the projector to acquire the captured image of the stripe pattern, and a hardware processor. The hardware processor measures a three-dimensional shape of a measurement target based on the captured image. The hardware processor determines, from a plurality of cycle candidates, a cycle of a stripe pattern to be projected by the projector. The plurality of cycle candidates are set based on a synthetic MTF characteristic generated by combining a first MTF characteristic of the projector lens and a second MTF characteristic of the camera lens.

17 Claims, 12 Drawing Sheets

(56) References Cited

U.S. PATENT DOCUMENTS

2008/0043249 A1* 2/2008 Iwasaki .............. G01B 11/2522 356/601
2009/0169095 A1* 7/2009 Zhuang .................. G06T 17/20 359/10
2010/0260409 A1* 10/2010 Ben-Levy ............... G06T 7/521 382/141
2011/0050859 A1* 3/2011 Kimmel ............. G01B 11/2509 382/106
2011/0058023 A1* 3/2011 Boles ................. G01B 11/2513 348/46
2011/0080471 A1* 4/2011 Song ....................... G06T 7/521 356/627
2012/0242795 A1* 9/2012 Kane .................... H04N 13/211 348/46
2013/0315501 A1* 11/2013 Atanassov ......... G01B 11/2513 382/275
2014/0307085 A1* 10/2014 Ohsawa ............... G01B 11/026 348/136
2016/0279809 A1* 9/2016 Nakajima .............. G06V 20/10
2017/0054965 A1* 2/2017 Raab ...................... G01B 11/25
2017/0094256 A1* 3/2017 Bronstein .......... G01B 11/2545
2017/0307469 A1* 10/2017 Kang ................... H04N 17/002
2018/0253863 A1* 9/2018 Wallack .................. G06T 7/521
2018/0373171 A1* 12/2018 Hugers ................. G03F 9/7026
2019/0043212 A1* 2/2019 Sugimura .............. G01B 11/24
2019/0146073 A1* 5/2019 Gutierrez ................ G01S 7/484 356/5.01
2019/0293409 A1* 9/2019 Matsuda ................. G06T 7/521
2019/0310079 A1* 10/2019 Hoegele ................. G01C 11/30
2020/0033119 A1* 1/2020 Ohnishi .................. G06T 7/521
2020/0056882 A1* 2/2020 Yu ...................... G01B 11/2536
2020/0334844 A1* 10/2020 Miyata .................. G06T 7/0004
2020/0408512 A1* 12/2020 Sakamoto ............ G01B 11/254
2021/0140763 A1* 5/2021 Pesach ................. A61B 5/0088
2021/0166410 A1* 6/2021 Saitou ................... G01S 7/4816
2022/0182519 A1* 6/2022 Yamauchi ............... G06T 7/521
2022/0277466 A1* 9/2022 Yamauchi .......... G01B 11/2513
2022/0311987 A1* 9/2022 Balatzis ............... H04N 13/271

FOREIGN PATENT DOCUMENTS

JP 2018-146521 A 9/2018
JP 2019-191310 A 10/2019

* cited by examiner

| | PHASE φ | HEIGHT h |
|---|---|---|
| IDEAL | 0° | 100mm |
| ACTUAL MEASUREMENT | 350° | 110mm |

FIG.8

35

| DISTANCE | CYCLE CANDIDATE |
|---|---|
| 200mm | 20mm |
| 300mm | 30mm |
| : | : |
| 1000mm | *** |

THREE-DIMENSIONAL SHAPE MEASUREMENT APPARATUS AND MEASUREMENT METHOD, AND NON-TRANSITORY COMPUTER-READABLE RECORDING MEDIUM

CROSS-REFERENCE TO RELATED APPLICATIONS

The entire disclosure of Japanese Patent Application No. 2024-003795, filed on Jan. 15, 2024, is incorporated herein by reference in its entirety.

BACKGROUND OF THE INVENTION

Technological Field

The present disclosure relates to a three-dimensional shape measurement apparatus, a three-dimensional shape measurement method, and a non-transitory computer-readable recording medium.

Description of the Related Art

Conventionally, an apparatus that measures a three-dimensional shape using the principle of the phase shift method (hereinafter referred to as "three-dimensional shape measurement apparatus") has been developed. For example, a three-dimensional shape measurement apparatus is disclosed in each of Japanese Laid-Open Patent Publication No. 2019-191310, Japanese Laid-Open Patent Publication No. 2018-146521, Japanese Laid-Open Patent Publication No. 2013-88261, and Japanese Laid-Open Patent Publication No. 2016-31284. The three-dimensional shape measurement apparatus using the phase shift method includes a projector that projects a stripe pattern on a measurement target, and a camera that captures an image of the measurement target on which the stripe pattern is projected.

SUMMARY OF THE INVENTION

In the case of a three-dimensional shape measurement apparatus using the phase shift method, depending on the cycle of a stripe pattern projected on a measurement target, the contrast of a captured image obtained by capturing an image of the stripe pattern with a camera varies. As the contrast of the captured image decreases, a variation in the height position of a three-dimensional shape to be output increases, resulting in decrease of the measurement accuracy of the three-dimensional shape.

An object of the present disclosure is to improve the measurement accuracy of a three-dimensional shape measured by a three-dimensional shape measurement apparatus using the phase shift method.

To achieve at least one of the abovementioned objects, according to an aspect of the present invention, a three-dimensional shape measurement apparatus reflecting one aspect of the present invention comprises: a projector that includes a projector lens and projects a stripe pattern; a camera that includes a camera lens and captures an image of the stripe pattern projected by the projector to acquire the captured image of the stripe pattern; and a hardware processor. The hardware processor measures a three-dimensional shape of a measurement target based on the captured image. The hardware processor determines a cycle of the stripe pattern to be projected by the projector from a plurality of cycle candidates. The plurality of cycle candidates are set based on a synthetic MTF (Modulation Transfer Function) characteristic generated by combining a first MTF characteristic of the projector lens and a second MTF characteristic of the camera lens.

To achieve at least one of the abovementioned objects, according to an aspect of the present invention, a measurement method for measuring a three-dimensional shape of a measurement target by a three-dimensional shape measurement apparatus, reflecting one aspect of the present invention, comprises: determining a cycle of a stripe pattern to be projected by a projector including a projector lens, from a plurality of cycle candidates; projecting the stripe pattern by the projector; capturing an image of the stripe pattern projected by the projector, by a camera including a camera lens, to acquire the captured image of the stripe pattern; and measuring a three-dimensional shape of the measurement target based on the captured image. The plurality of cycle candidates are set based on a synthetic MTF characteristic generated by combining a first MTF characteristic of the projector lens and a second MTF characteristic of the camera lens.

To achieve at least one of the abovementioned objects, according to an aspect of the present invention, a non-transitory computer-readable recording medium storing a measurement program for causing one or more computers to execute a measurement method for measuring a three-dimensional shape of a measurement target by a three-dimensional shape measurement apparatus, reflecting one aspect of the present invention is provided. The measurement method comprises: determining a cycle of a stripe pattern to be projected by a projector including a projector lens, from a plurality of cycle candidates; projecting the stripe pattern by the projector; capturing an image of the stripe pattern projected by the projector, by a camera including a camera lens, to acquire the captured image of the stripe pattern; and measuring a three-dimensional shape of the measurement target based on the captured image. The plurality of cycle candidates are set based on a synthetic MTF characteristic generated by combining a first MTF characteristic of the projector lens and a second MTF characteristic of the camera lens.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 8 is a diagram illustrating an exemplary table 35.

DETAILED DESCRIPTION

Hereinafter, one or more embodiments of the present invention will be described with reference to the drawings. However, the scope of the invention is not limited to the disclosed embodiments. In the following description, the same parts and constituent elements are denoted with the same reference signs. Their names and functions are the same. Therefore, a detailed description thereof will not be repeated. Note that the embodiments and modifications described below may be selectively combined as appropriate.

Exemplary Application of Three-Dimensional Shape Measurement Apparatus

Figure 1:
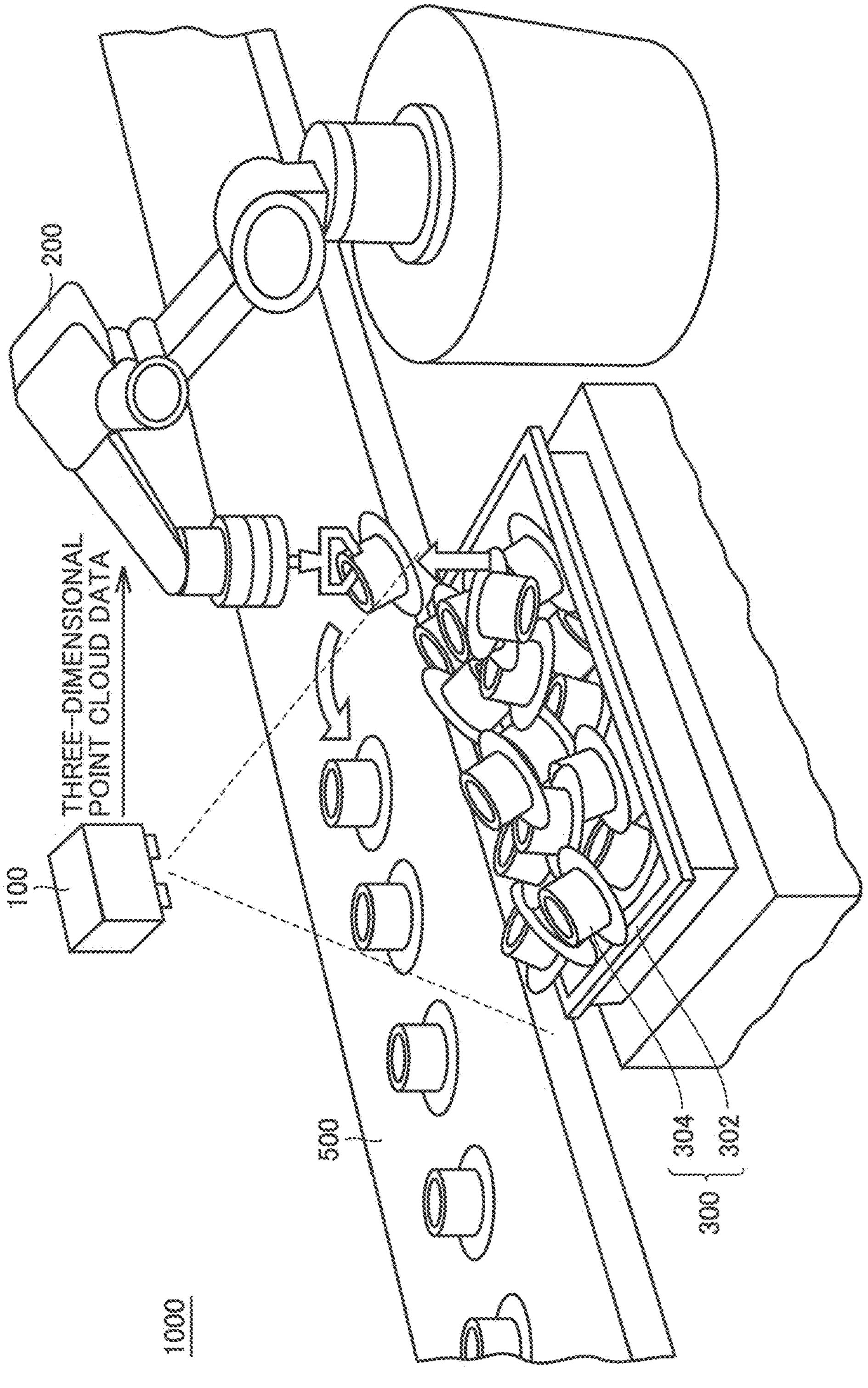
FIG. 1 is a diagram schematically illustrating an exemplary system to which a three-dimensional shape measurement apparatus according to an embodiment is applied.

FIG. 1 is a diagram schematically illustrating an exemplary system to which a three-dimensional shape measurement apparatus according to an embodiment is applied. A system 1000 includes a three-dimensional shape measurement apparatus 100 and a robot 200.

The three-dimensional shape measurement apparatus 100 measures a three-dimensional shape of a measurement target 300 using the principle of the phase shift method. The measurement target 300 includes a tray 302 and a plurality of workpieces 304 placed in bulk on the tray 302. The three-dimensional shape measurement apparatus 100 outputs, to the robot 200, data (hereinafter referred to as "three-dimensional point cloud data") indicating the measured three-dimensional shape.

Based on the three-dimensional point cloud data received from the three-dimensional shape measurement apparatus 100, the robot 200 determines a workpiece 304 to be grasped and performs a pick-and-place operation for the workpiece 304 to be grasped. Specifically, the robot 200 grasps a workpiece 304 on the tray 302 and places the workpiece 304 on a conveyance belt 500.

Note that the system to which the three-dimensional shape measurement apparatus 100 is applied is not limited to the system 1000 illustrated in FIG. 1. The three-dimensional shape measurement apparatus 100 is used for various purposes of use.

<Configuration of Three-Dimensional Shape Measurement Apparatus 100>

Figure 2:
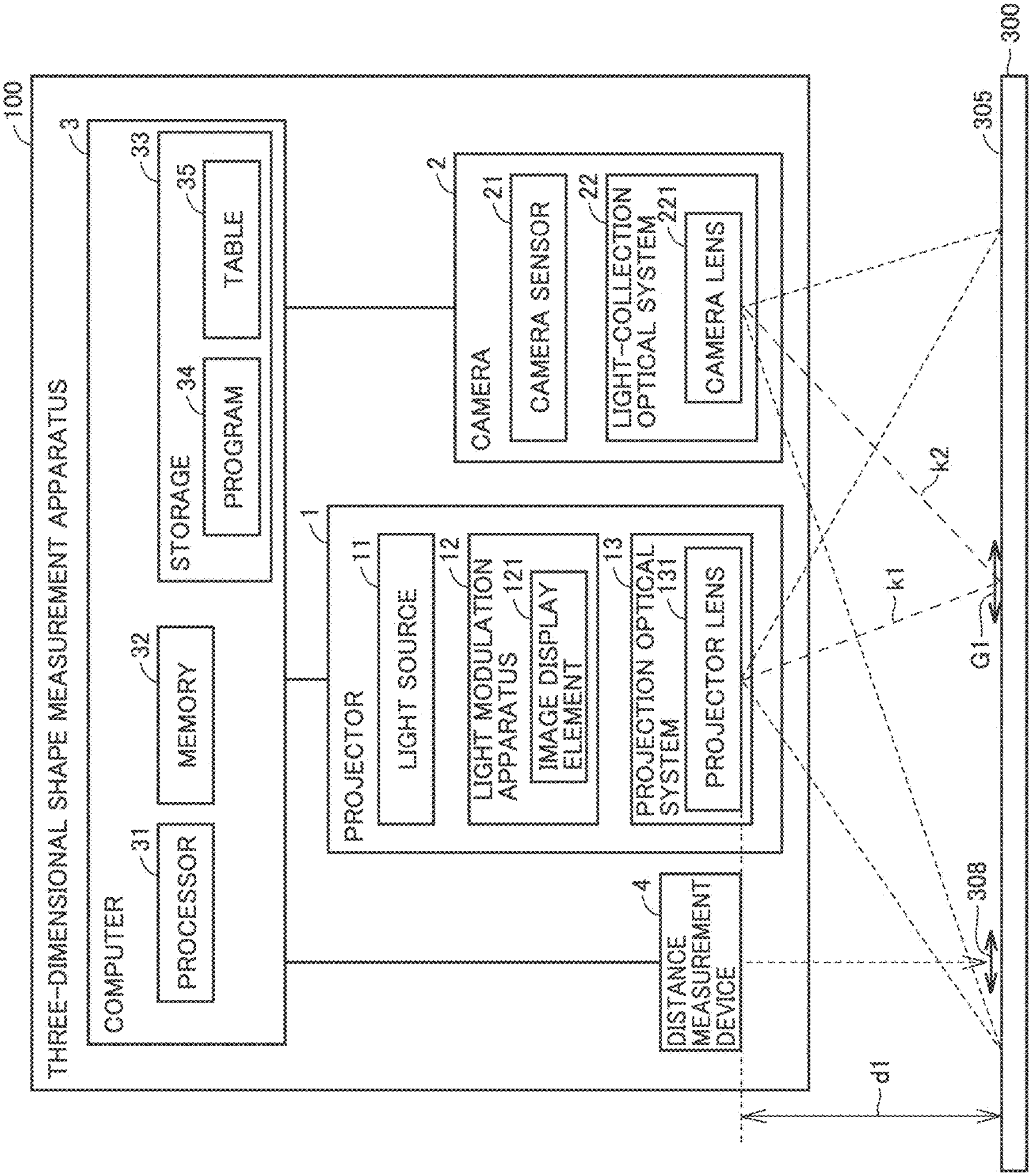
FIG. 2 is a diagram illustrating an exemplary hardware configuration of the three-dimensional shape measurement apparatus 100.

FIG. 2 is a diagram illustrating an exemplary hardware configuration of the three-dimensional shape measurement apparatus 100. As illustrated in FIG. 2, the three-dimensional shape measurement apparatus 100 includes a projector 1, a camera 2, a computer 3, and a distance measurement device 4.

The projector 1 includes a light source 11, a light modulation apparatus 12, and a projection optical system 13. A light flux emitted from the light source 11 is modulated by the light modulation apparatus 12 and is projected on the measurement target 300 via the projection optical system 13.

The light source 11 includes, for example, a light emitting diode (LED), an ultra-high pressure mercury lamp, or a halogen lamp. For example, the light source 11 emits white light. Note that the light source 11 may emit monochromatic light of red, blue, or green.

The light modulation apparatus 12 modulates the light from the light source 11 to generate a projection image. The light modulation apparatus 12 includes an image display element 121. The image display element 121 is, for example, a digital micromirror device (DMD) or a liquid crystal panel. In the present embodiment, the light modulation apparatus 12 is capable of generating a stripe pattern as a projection image. Here, the stripe pattern will be described with reference to FIG. 3.

Figure 3:
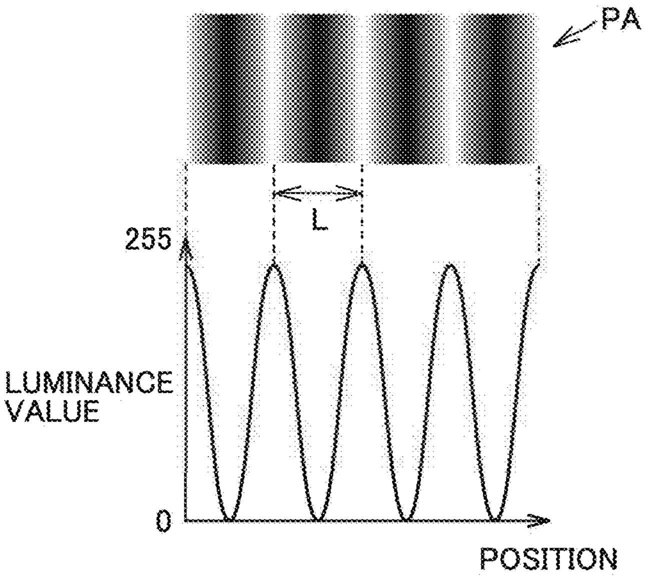
FIG. 3 is a diagram illustrating a stripe pattern and a cycle of the stripe pattern.

FIG. 3 is a diagram illustrating a stripe pattern and a cycle of the stripe pattern. A stripe pattern PA is illustrated in the upper part of FIG. 3, as an example of the stripe pattern. A graph in which the horizontal axis represents a position and the vertical axis represents a luminance value is illustrated in the lower part of FIG. 3. As illustrated in FIG. 3, the stripe pattern is a pattern in which black lines and white lines are alternately repeated. More specifically, in the stripe pattern, the luminance value changes sinusoidally with position. The light modulation apparatus 12 changes a cycle L of the stripe pattern under control by the computer 3. That is, the cycle L of the stripe pattern generated by the light modulation apparatus 12 is variable.

Referring again to FIG. 2, the projection optical system 13 projects, on the measurement target 300, the projection image (i.e., the stripe pattern) generated by the light modulation apparatus 12. The projection optical system 13 includes one or more lenses. In the example illustrated in FIG. 2, the projection optical system 13 includes a projector lens 131. The stripe pattern generated by the light modulation apparatus 12 is enlarged by the projector lens 131 and projected on the measurement target 300. Thus, an enlarged stripe pattern is formed on a measurement surface 305 of the three-dimensional shape measurement apparatus 100. That is, the cycle L of the stripe pattern on the image display element 121 differs from the cycle L of the stripe pattern on the measurement surface 305.

The camera 2 captures an image of a subject and generates image data (hereinafter referred to as "captured image"). By way of example, the camera 2 captures an image of the stripe pattern projected on the measurement target 300 by the projector 1 to acquire the captured image of the stripe pattern. The camera 2 includes a camera sensor 21 and a light-collection optical system 22.

The camera sensor 21 converts, into an electric signal, the intensity of light obtained through the light-collection optical system 22. The camera sensor 21 includes, for example, a charge coupled device (CCD) or a complementary metal-oxide-semiconductor (CMOS).

The light-collection optical system 22 is an optical system for collecting light incident from the outside, and typically includes one or more lenses. In the example illustrated in FIG. 2, the light-collection optical system 22 includes a camera lens 221.

The cycle L of the stripe pattern in the captured image, that is, the stripe pattern on the camera sensor 21 differs from the cycle L of the stripe pattern on the measurement surface 305.

The distance measurement device 4 is disposed at the same height as that of the projector 1. The distance measurement device 4 measures a distance d1 between the projector 1 and the measurement target 300. Hereinafter, the distance d1 measured by the distance measurement device 4 is referred to as "measurement distance." The distance measurement device 4 includes, for example, a millimeter-wave sensor or the like that can measure the distance in a short time. However, the distance measurement device 4 is not limited thereto, and may be configured as a known distance measurement sensor.

The distance measurement device 4 may measure, for example, the distance to a partial range 308 that is a part of the measurement target 300. The partial range 308 has a length of, for example, one cycle of the stripe pattern on the measurement surface 305.

A user adjusts the focus of the projector lens 131 and the focus of the camera lens 221 depending on the distances d1 between the projector 1 and the measurement target 300. Note that the projector 1 may include an autofocus mechanism that automatically adjusts the focus of the projector lens 131 on the measurement target 300. Further, the camera 2 may include an autofocus mechanism that automatically adjusts the focus of the camera lens 221 on the measurement target 300.

The computer 3 controls the projector 1, the camera 2, and the distance measurement device 4. The computer 3 includes a processor 31, a memory 32, and a storage 33.

The processor 31 is an example of "hardware processor" in the present disclosure. The processor 31 is constituted, for example, of a central processing unit (CPU), a micro-processing unit (MPU), or the like. The memory 32 is constituted, for example, of a volatile storage device such as a dynamic random access memory (DRAM) or a static random access memory (SRAM). The storage 33 is constituted, for example, of a nonvolatile storage device such as a hard disk drive (HDD), a solid state drive (SSD), or a flash memory.

The storage 33 stores a program 34. The program 34 includes one or more computer-readable instructions for controlling the projector 1, the camera 2, and the distance measurement device 4. The program 34 includes a "measurement program" in the present disclosure. The storage 33 is an example of "non-transitory computer-readable recording medium" in the present disclosure. The processor 31 controls the projector 1, the camera 2, and the distance measurement device 4 by executing the program 34, to thereby implement various types of processing according to the present embodiment.

The program 34 may be incorporated in a part of an appropriate program and provided, rather than provided as a single program. In this case, the processing according to the present embodiment is implemented in cooperation with the appropriate program. Such a program that does not include a part of modules is not deviated from the gist of the three-dimensional shape measurement apparatus 100 according to the present embodiment. Further, part or all of the functions provided by the program 34 may be implemented by dedicated hardware.

The storage 33 further stores a table 35. The table 35 is used for controlling the cycle L of the stripe pattern projected by the projector 1.

<Phase Shift Method>

The processor 31 measures the three-dimensional shape of the measurement target 300 using the principle of the phase shift method. Specifically, the processor 31 controls the projector 1 to project the stripe pattern while shifting the phase. The processor 31 acquires, from the camera 2, a plurality of captured images corresponding to a plurality of phase shift amounts of the stripe pattern. For example, the processor 31 acquires four captured images for respective phase shift amounts of 0, π/2, π, and 3π/2.

The luminance value of each pixel in the plurality of captured images is expressed by the following formula (1).

$$Ii=a\cos(\varphi+\delta i)+b \quad \text{Formula (1)}$$

"Ii" represents the luminance value in an i-th captured image. "a" represents a contrast component. "b" represents an offset component. "δi" represents a phase shift amount corresponding to the i-th captured image. "φ" represents a phase.

In Formula (1), unknowns are "a", "b", and "p". Therefore, the processor 31 can calculate "a", "b", and "φ" for each pixel by acquiring at least three captured images.

Figure 4:
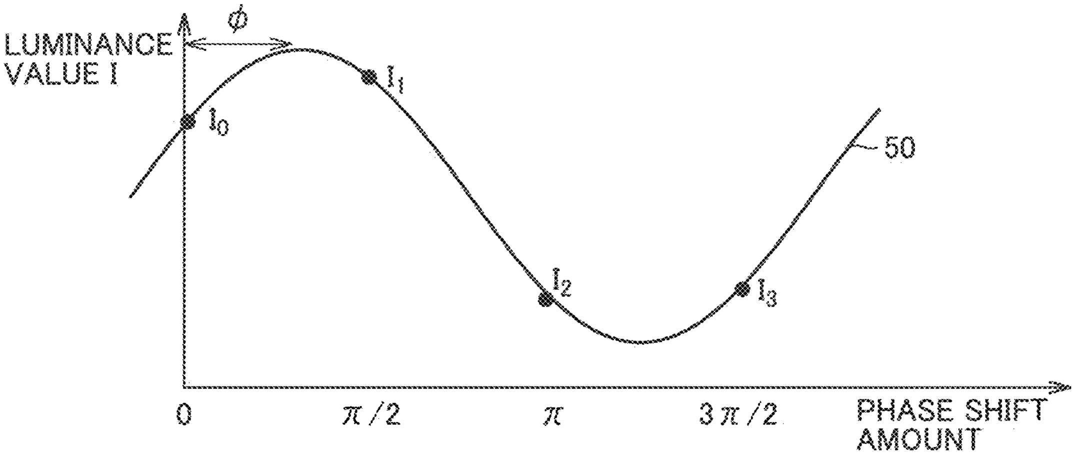
FIG. 4 is a diagram illustrating luminance values and phase shift amounts of a certain pixel in four captured images corresponding to phase shift amounts of 0, $\pi/2$, $\pi$, and $3\pi/2$.

FIG. 4 is a diagram illustrating the luminance values and phase shift amounts of a certain pixel in four captured images corresponding to the phase shift amounts of 0, π/2, π, and 3π/2. The processor 31 calculates the phase φ by specifying a cosine curve 50 that approximates to the luminance values and phase shift amounts of the four captured images. To be specific, when "I0" represents a luminance value in the captured image corresponding to the phase shift amount of 0, "I1" represents a luminance value in the captured image corresponding to the phase shift amount of π/2, "I2" represents a luminance value in the captured image corresponding to the phase shift amount of h, and "I3" represents a luminance value in the captured image corresponding to the phase shift amount of 3π/2, the phase φ is calculated in accordance with the following formula (2).

$$\tan\varphi=-(I3-I1)/(I2-I0) \quad \text{Formula (2)}$$

The phase φ and the height h of the measurement target 300 in the pixel satisfy the following formula (3).

$$h=(p/\sin\alpha)\times(\varphi+2n\pi)/2\pi \quad \text{Formula (3)}$$

"p" represents a pitch of the stripe pattern. "α" represents a projection angle of the stripe pattern. "n" represents an order. The processor 31 converts the phase φ into the height h in accordance with Formula (3), and generates three-dimensional point cloud data indicating the height h for each pixel.

The luminance value of each pixel indicated by the captured image may include an error due to an influence of noise of the camera 2, a linearity error of the projector 1, or the like. Hereinafter, the error included in the luminance value is referred to as "luminance error."

Figure 5:
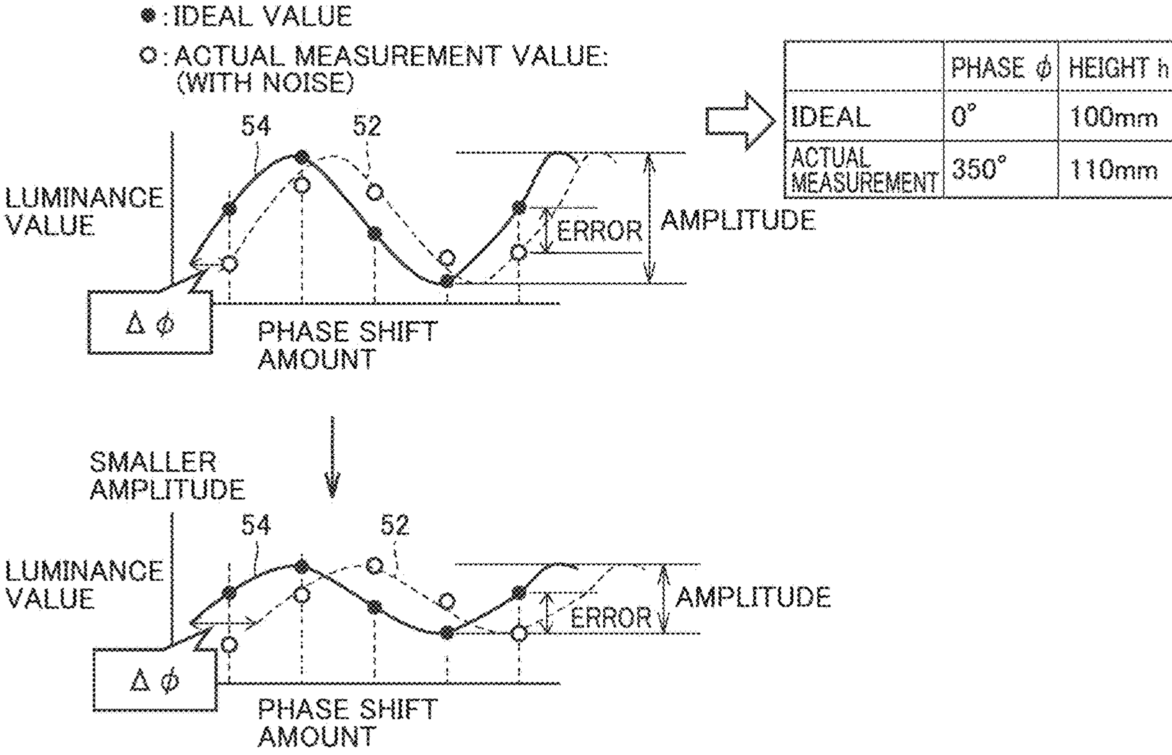
FIG. 5 is a diagram illustrating an influence of a luminance error on three-dimensional shape measurement.

FIG. 5 is a diagram illustrating the influence of the luminance error on the three-dimensional shape measurement. In FIG. 5, a curve 52 is a cosine curve that approximates to the luminance values and phase shift amounts in the plurality of captured images. The curve 52 is specified using the luminance value including the luminance error. In FIG. 5, a curve 54 is a cosine curve that approximates to ideal luminance values including no luminance errors and phase shift amounts. As illustrated in FIG. 5, a phase error Δφ is generated between the curve 52 and the curve 54 due to the influence of the luminance error. That is, the phase φ calculated from the curve 52 includes the phase error Δφ.

Due to the influence of the phase error Δφ, an error is also generated in the height h converted from the phase φ. In the example illustrated in FIG. 5, a phase error Δφ of 350° is included, with the result that an error of 10 mm is included in the height h converted from the phase φ. In this way, the error is also generated in the height h due to the influence of the luminance error.

If the amplitude of the luminance value when the phase shift amount is changed is decreased, the influence of the luminance error becomes relatively large. As a result, the phase error $\Delta\varphi$ is increased to result in an increased error included in the height h converted from the phase $\varphi$. Hereinafter, the error of the height h is also referred to as "measurement error."

The amplitude of the luminance value when the phase shift amount is changed is correlated with the contrast of the stripe pattern in the captured image. If the contrast of the stripe pattern in the captured image is decreased, the amplitude of the luminance value when the phase shift amount is changed is decreased. Therefore, if the contrast of the stripe pattern in the captured image is decreased, the error included in the height h converted from the phase $\varphi$ is increased.

Figure 6:
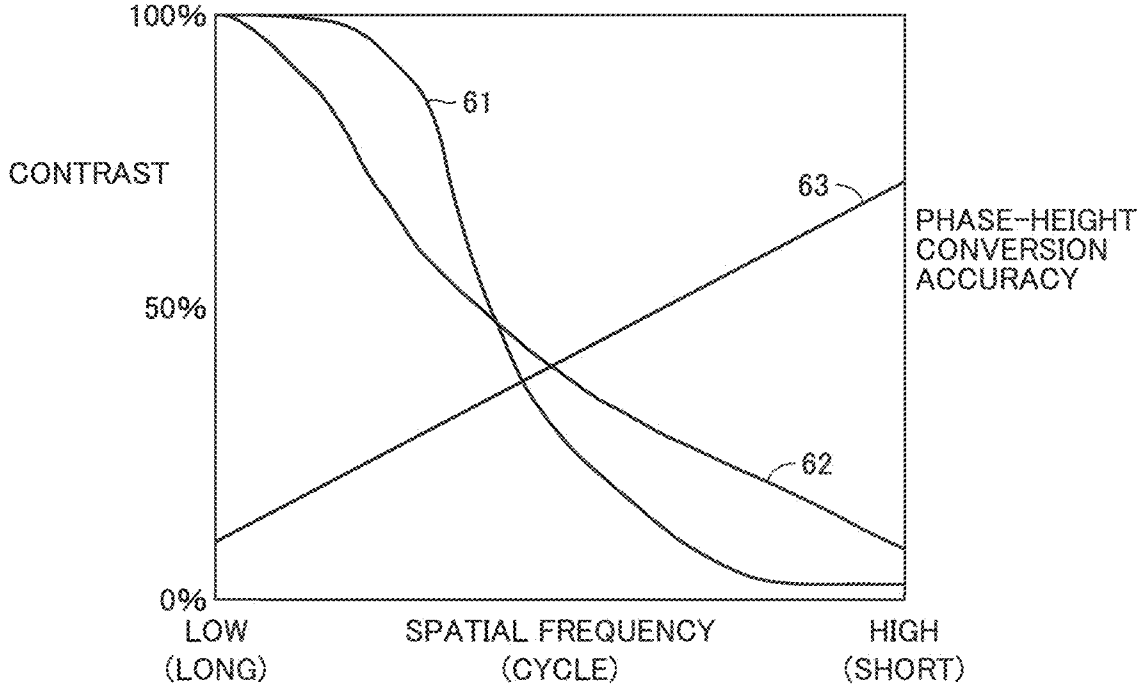
FIG. 6 is a diagram illustrating a relationship between an MTF characteristic of a lens and an accuracy of conversion from a phase $\varphi$ to a height h.

FIG. 6 is a diagram illustrating a relationship between an MTF characteristic of a lens and an accuracy of conversion from a phase $\varphi$ to a height h. An MTF characteristic is an index for evaluating the performance of the lens. The MTF characteristic is different depending on the lens. The MTF characteristic represents a correlation between a spatial frequency and contrast performance of the lens. The contrast performance of a lens is represented by the contrast of an image of a stripe pattern formed by the lens. The spatial frequency represents the number of line pairs (one black line and one white line in the stripe pattern) per millimeter. The unit of the spatial frequency is 1 p/mm. The higher the spatial frequency, the shorter the cycle of the stripe pattern.

A line 61 represents an MTF characteristic of the lens a. The MTF characteristic of the lens a indicates a correlation between the spatial frequency and the contrast of the image of the stripe pattern formed by the lens a. A line 62 represents an MTF characteristic of a lens b, which is different from the lens a. The MTF characteristic of the lens b indicates a correlation between the spatial frequency and the contrast of the image of the stripe pattern formed by the lens b. A line 63 represents a correlation between the spatial frequency and the accuracy of conversion from a phase $\varphi$ to a height h.

As illustrated in FIG. 6, in general, the higher the special frequency, the lower the contrast. In other words, the shorter the cycle of the stripe pattern, the lower the contrast. Further, the higher the spatial frequency, the higher the accuracy of conversion from a phase $\varphi$ to a height h. In other words, the shorter the cycle of the stripe pattern, the higher the accuracy of conversion from a phase $\varphi$ to a height h. This is because a coefficient of a pitch p of the stripe pattern is present in the right side of the above Formula (3) used for the conversion from the phase $\varphi$ to the height h.

In view of the characteristics illustrated in FIG. 6, the decrease of the contrast is suppressed by increasing the cycle of the stripe pattern. However, if the cycle of the stripe pattern is too long, the accuracy of conversion from the phase $\varphi$ to the height h decreases, resulting in decrease of the measurement accuracy of the three-dimensional shape.

Therefore, for the three-dimensional shape measurement apparatus 100 according to the present embodiment, cycle candidates of the stripe pattern are set in consideration of the contrast and the accuracy of conversion from the phase $\varphi$ to the height h.

<Processing in Three-Dimensional Shape Measurement Apparatus 100>

(Overview of Processing in Three-Dimensional Shape Measurement Apparatus 100)

Figure 7:
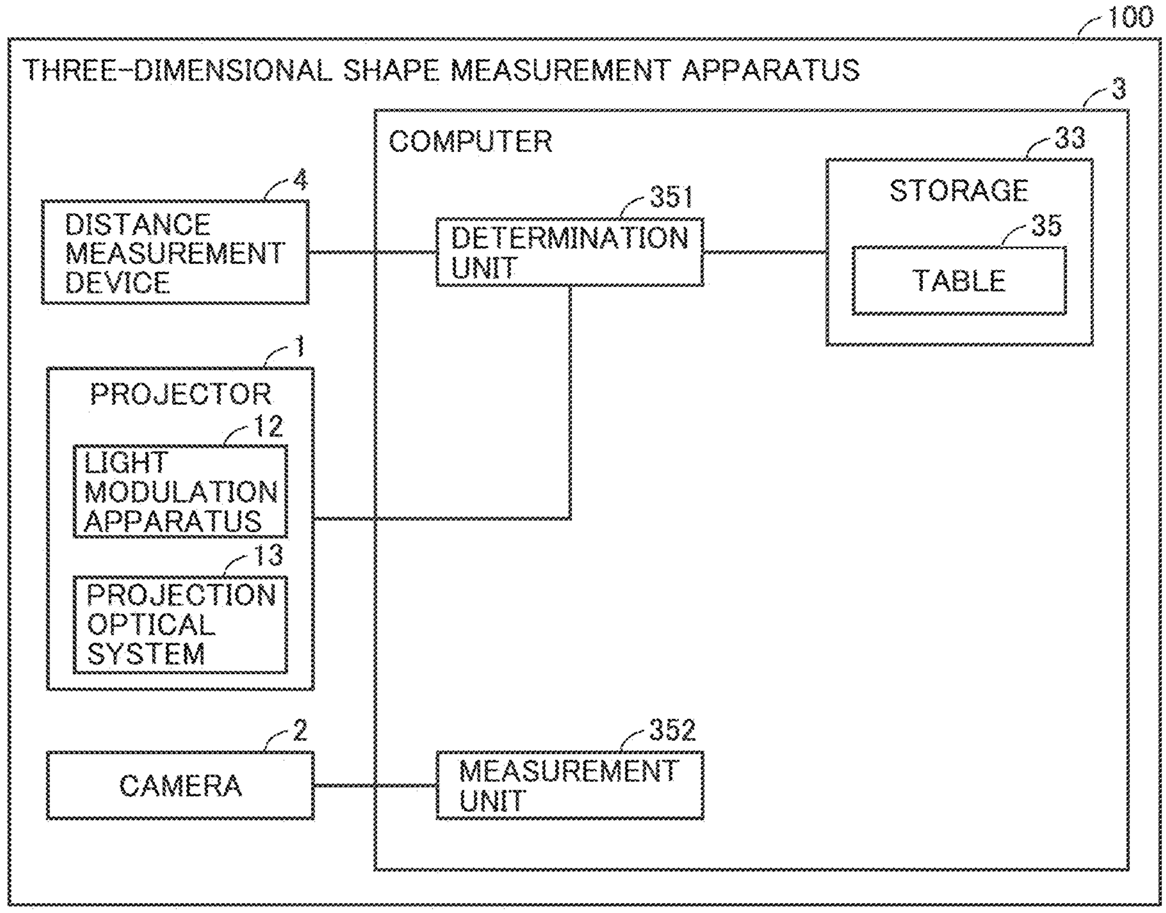
FIG. 7 is a diagram illustrating an overview of processing in the three-dimensional shape measurement apparatus 100.

FIG. 7 is a diagram illustrating an overview of processing in the three-dimensional shape measurement apparatus 100. The three-dimensional shape measurement apparatus 100 includes the projector 1, the camera 2, the computer 3, and the distance measurement device 4. The computer 3 includes a determination unit 351, a measurement unit 352, and a storage 33. The determination unit 351 and the measurement unit 352 are implemented by the processor 31 that executes the program 34.

The distance measurement device 4 measures the distance d1 (i.e., measurement distance) between the projector 1 and the measurement target 300. The determination unit 351 determines, from a plurality of cycle candidates, the cycle L of the stripe pattern projected on the measurement target 300 by the projector 1, based on the measurement distance measured by the distance measurement device 4. The plurality of cycle candidates are included in a table 35 stored in the storage 33.

The light modulation apparatus 12 generates a stripe pattern having the cycle L determined by the determination unit 351. The projection optical system 13 enlarges and projects, on the measurement target 300, the stripe pattern generated by the light modulation apparatus 12.

The camera 2 captures an image of the stripe pattern projected by the projector 1 and acquires the captured image of the stripe pattern. The measurement unit 352 measures the three-dimensional shape of the measurement target 300 based on the captured image using the principle of the phase shift method.

(Table)

FIG. 8 is a diagram illustrating an exemplary table 35. As illustrated in FIG. 8, the table 35 associates each of a plurality of cycle candidates with the distances d1 between the projector 1 and the measurement target 300. The cycle candidate represents the cycle L of the stripe pattern generated in the light modulation apparatus 12 (e.g., the stripe pattern on the image display element 121). The cycle candidate is set in advance so as to minimize the measurement error to be generated when the three-dimensional shape of the measurement target 300 located away from the projector 1 by a distance corresponding to the cycle candidate is measured.

(Method of Setting Cycle Candidate)

Figure 9:
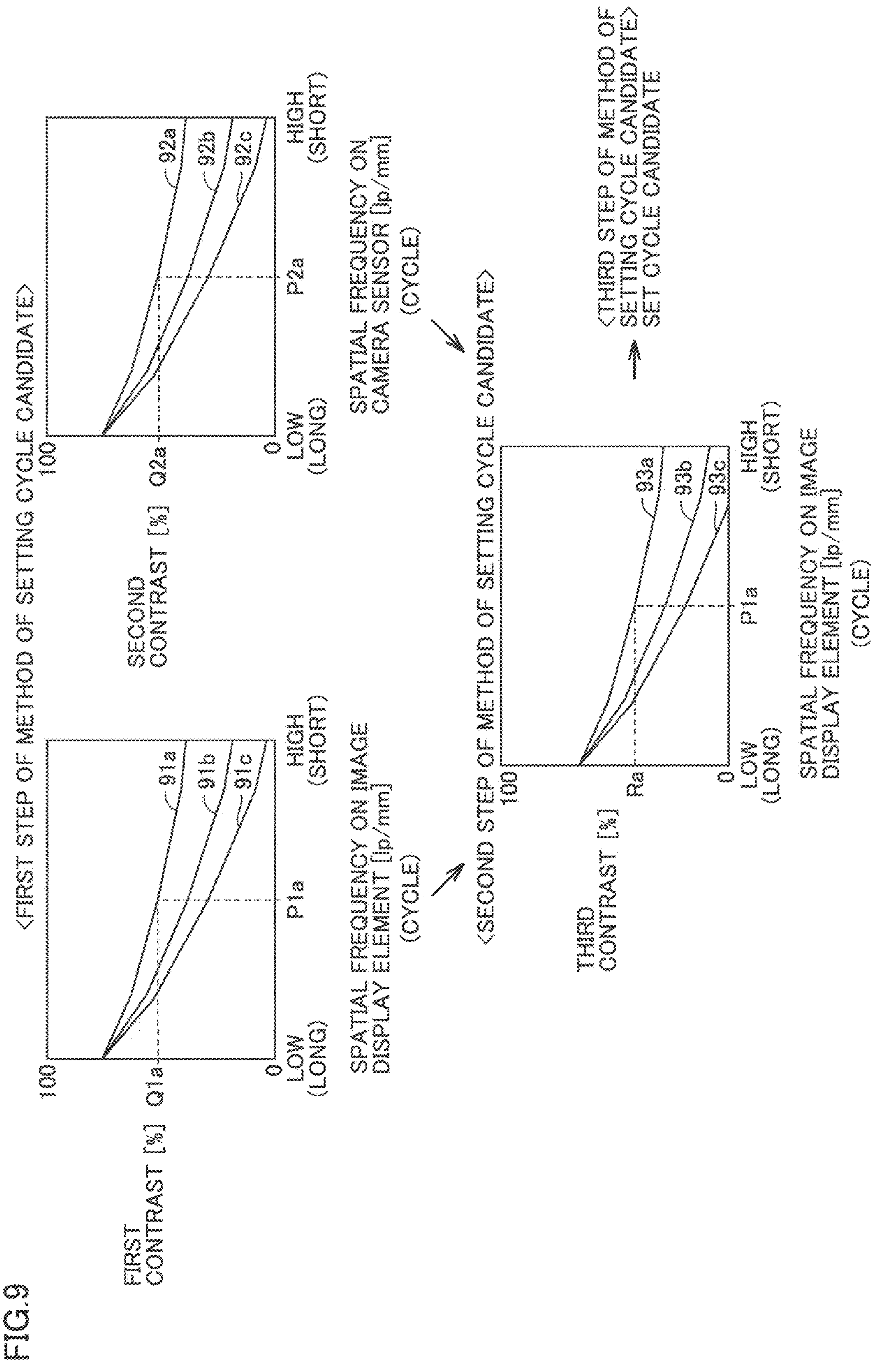
FIG. 9 is a diagram illustrating a method of setting a cycle candidate.

A method of setting the cycle candidate will be described with reference to FIG. 9. FIG. 9 is a diagram illustrating the method of setting the cycle candidate.

In a first step of the method of setting the cycle candidate, an MTF characteristic of the projector lens 131 and an MTF characteristic of the camera lens 221, for the distance d1 between the projector 1 and the measurement target 300 are acquired by an experiment. A line 91*a* represents the MTF characteristic of the projector lens 131 in the case where the distance d1 between the projector 1 and the measurement target 300 is 200 mm. A line 91*b* represents the MTF characteristic of the projector lens 131 in the case where the distance d1 between the projector 1 and the measurement target 300 is 300 mm. A line 91*c* represents the MTF characteristic of the projector lens 131 in the case where the distance d1 between the projector 1 and the measurement target 300 is 500 mm. A line 92*a* represents the MTF characteristic of the camera lens 221 in the case where the distance d1 between the projector 1 and the measurement target 300 is 200 mm. A line 92*b* represents the MTF characteristic of the camera lens 221 in the case where the distance d1 between the projector 1 and the measurement target 300 is 300 mm. A line 92*c* represents the MTF characteristic of the camera lens 221 in the case where the distance d1 between the projector 1 and the measurement target 300 is 500 mm.

The MTF characteristic of the projector lens 131 is an example of "first MTF characteristic" in the present disclosure. The MTF characteristic of the projector lens 131 represents a correlation between the spatial frequency on the image display element 121 (the cycle L of the stripe pattern on the image display element 121) and a first contrast representing the contrast performance of the projector lens 131.

The MTF characteristic of the camera lens 221 is an example of "second MTF characteristic" in the present disclosure. The MTF characteristic of the camera lens 221 represents a correlation between the spatial frequency on the camera sensor 21 (the cycle L of the stripe pattern on the camera sensor 21) and a second contrast representing the contrast performance of the camera lens 221.

The MTF characteristic of the projector lens 131 for a target distance among a plurality of distances between the projector 1 and the measurement target 300, and the MTF characteristic of the camera lens 221 for the target distance are acquired in accordance with a method of acquiring the MTF characteristic described below.

In a first step of the method of acquiring the MTF characteristic, a screen is installed at a position located away from the projector 1 by the target distance, and the projector lens 131 and the camera lens 221 are focused on the surface of the screen.

In a second step of the method of acquiring the MTF characteristic, a plurality of stripe patterns having different cycles L are sequentially projected on the screen by the projector 1.

In a third step of the method of acquiring the MTF characteristic, for each stripe pattern projected on the screen, the contrast in a predetermined region including the position on an optical axis k1 (see FIG. 2) of the projector lens 131 in the stripe pattern is measured. The predetermined region including the position on the optical axis k1 of the projector lens 131 in the stripe pattern projected on the screen is, for example, a region G1 illustrated in FIG. 2. The optical axis k1 is an example of "first optical axis" in the present disclosure.

In a fourth step of the method of acquiring the MTF characteristic, the MTF characteristic of the projector lens 131 is generated by associating the spatial frequency of the stripe pattern on the image display element 121 that is projected on the screen, with the contrast of the stripe pattern measured in the third step of the method of acquiring the MTF characteristic.

In a fifth step of the method of acquiring the MTF characteristic, a plurality of test charts are sequentially arranged on the screen and their images are captured by the camera 2. A stripe pattern is drawn on each test chart. The plurality of test charts have different cycles L of the stripe patterns from each other.

In a sixth step of the method of acquiring the MTF characteristic, for each test chart, the contrast on the camera sensor 21 is measured for a predetermined region including the position on an optical axis k2 (see FIG. 2) of the camera lens 221 in the test chart. The predetermined region including the position on the optical axis k2 of the camera lens 221 in the test chart is the region G1 illustrated in FIG. 2. The optical axis k2 is an example of "second optical axis" in the present disclosure.

In a seventh step of the method of acquiring the MTF characteristic, the MTF characteristic of the camera lens 221 is generated by associating the spatial frequency, on the camera sensor 21, of the stripe pattern drawn on the test chart, with the contrast of the test chart measured in the sixth step of the method of acquiring the MTF characteristic.

In this way, the MTF characteristic of the projector lens 131 and the MTF characteristic of the camera lens 221 are acquired for each of a plurality of distances between the projector 1 and the measurement target 300.

In a second step of the method of setting the cycle candidate, a synthetic MTF characteristic for the distance d1 between the projector 1 and the measurement target 300 is generated. A line 93*a* represents a synthetic MTF characteristic in the case where the distance d1 between the projector 1 and the measurement target 300 is 200 mm. A line 93*b* represents a synthetic MTF characteristic in the case where the distance d1 between the projector 1 and the measurement target 300 is 300 mm. A line 93*c* represents a synthetic MTF characteristic in the case where the distance d1 between the projector 1 and the measurement target 300 is 500 mm.

The synthetic MTF characteristic is generated by combining the MTF characteristic of the projector lens 131 and the MTF characteristic of the camera lens 221. The synthetic MTF characteristic represents a correlation between the spatial frequency on the image display element 121 (the cycle L of the stripe pattern on the image display element 121) and a third contrast. The third contrast is expressed by the following Formula (4).

$$R = Q1/100 \times Q2/100 \times 100 \quad \text{Formula (4)}$$

"R" represents the third contrast (%) for a first spatial frequency P1 on the image display element 121 indicated by the synthetic MTF characteristic. "Q1" represents a first contrast (%) for the first spatial frequency P1 on the image display element 121 indicated by the MTF characteristic of the projector lens 131. "Q2" represents a second contrast (%) for a second spatial frequency P2 on the camera sensor 21 indicated by the MTF characteristic of the camera lens 221. The first spatial frequency P1 on the image display element 121 and the second spatial frequency P2 on the camera sensor 21 have the same spatial frequency on the measurement surface 305 of the three-dimensional shape measurement apparatus 100.

The first spatial frequency on the image display element 121 and the second spatial frequency on the camera sensor 21 that have the same spatial frequency on the measurement surface 305 are specified by a first conversion process and a second conversion process.

The first conversion process is a process of converting, based on the following three elements e1 to e3, the first spatial frequency on the image display element 121 of the MTF characteristic of the projector lens 131, into the spatial frequency on the measurement surface 305 of the three-dimensional shape measurement apparatus 100.

- Element e1: the distance between the projector 1 and the measurement target 300
- Element e2: the focal length of the projector lens 131
- Element e3: the inclination of the optical axis k1 of the projector lens 131

The second conversion process is a process of converting, based on the following three elements e4 to e6, the second spatial frequency on the camera sensor 21 of the MTF characteristic of the camera lens 221, into the spatial frequency on the measurement surface 305 of the three-dimensional shape measurement apparatus 100.

- Element e4: the distance between the camera 2 and the measurement target 300
- Element e5: the focal length of the camera lens 221

Element e6: the inclination of the optical axis k2 of the camera lens 221

"Ra" illustrated in FIG. 9 represents the third contrast (%) for the first spatial frequency P1*a* on the image display element 121 indicated by the synthetic MTF characteristic in the case where the distance d1 between the projector 1 and the measurement target 300 is 200 mm. "Q1*a*" illustrated in FIG. 9 represents the first contrast (%) for the first spatial frequency P1*a* on the image display element 121 indicated by the MTF characteristic of the projector lens 131 in the case where the distance d1 between the projector 1 and the measurement target 300 is 200 mm. "Q2*a*" illustrated in FIG. 9 represents the second contrast (%) for the second spatial frequencies P2*a* on the camera sensor 21 indicated by the MTF characteristic of the camera lens 221 in the case where the distances d1 between the projector 1 and the measurement target 300 is 200 mm. The first spatial frequency P1*a* on the image display element 121 and the second spatial frequency P2*a* on the camera sensor 21 have the same spatial frequency on the measurement surface 305 of the three-dimensional shape measurement apparatus 100.

In this way, the synthetic MTF characteristic is generated for each of the plurality of distances between the projector 1 and the measurement target 300.

In a third step of the method of setting the cycle candidate, a cycle candidate is set for each of the plurality of distances between the projector 1 and the measurement target 300. More specifically, in the case where a cycle candidate for a target distance among the plurality of distances between the projector 1 and the measurement target 300 is set, the cycle candidate is set to the shortest cycle in a range of the cycle of the stripe pattern for which the third contrast is equal to or more than a predetermined value, for the synthetic MTF characteristic for the target distance.

(Process Procedure of Processor 31)

Figure 10:
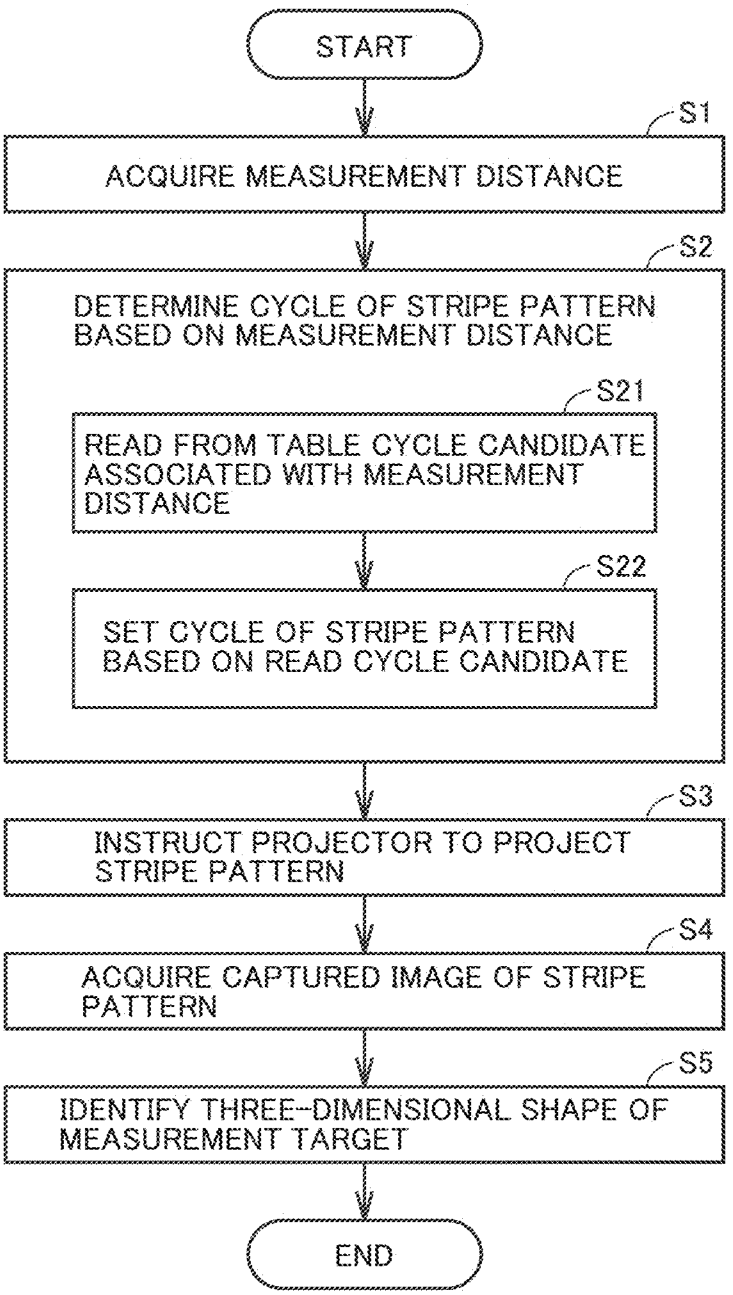
FIG. 10 is a flowchart illustrating a procedure of a measurement process by a processor 31.

FIG. 10 is a flowchart illustrating a procedure of a measurement process by the processor 31. The measurement process is started when the processor 31 receives an instruction to start measurement.

In step S1, the processor 31 acquires a measurement distance from the distance measurement device 4. In the next step S2, the processor 31 determines the cycle L of the stripe pattern to be projected by the projector 1, based on the measurement distance.

Step S2 includes steps S21 and S22. In step S21, the processor 31 reads, from the table 35, the cycle candidate associated with the measurement distance. In the next step S22, the processor 31 determines the cycle L of the stripe pattern on the basis of the read cycle candidate.

For example, when a distance that is different from the measurement distance by an extent falling in a predetermined range is included in the table 35, the processor 31 reads the cycle candidate associated with this distance and determines the read cycle candidate as the cycle L of the stripe pattern. When a distance that is different from the measurement distance by an extent falling in the predetermined range is not included in the table 35, the processor 31 reads two cycle candidates associated with two distances different from the measurement distance by a smaller extent, and determines the cycle L of the stripe pattern by an interpolation using the read two cycle candidates.

In the next step S3, the processor 31 instructs the projector 1 to project the stripe pattern having the cycle L determined in step S2 on the measurement target 300. Thus, the projector 1 projects, on the measurement target 300, the stripe pattern in an enlarged form having the cycle L determined in step S2.

In the next step S4, the processor 31 causes the camera 2 to capture an image of the stripe pattern projected on the measurement target 300, and acquires the captured image of the stripe pattern from the camera 2. In the next step S5, the processor 31 identifies the three-dimensional shape of the measurement target 300 based on the captured image, by using the principle of the phase shift method. After step S5, the measurement process ends.

Thus, the three-dimensional shape measurement apparatus 100 according to the present embodiment determines the cycle L of the stripe pattern to be projected by the projector 1, from a plurality of cycle candidates. The plurality of cycle candidates are set on the basis of a synthetic MTF characteristic generated by combining the MTF characteristic of the projector lens 131 and the MTF characteristic of the camera lens 221. Therefore, the three-dimensional shape measurement apparatus 100 according to the present embodiment can improve the measurement accuracy of the three-dimensional shape, relative to the measurement accuracy in the case where the cycle L of the stripe pattern is set by using the MTF characteristic of the projector lens without using the MTF characteristic of the camera lens.

The third contrast for the first spatial frequency on the image display element 121 indicated by the synthetic MTF characteristic is acquired by multiplying the first contrast for the first spatial frequency on the image display element 121 indicated by the MTF characteristic of the projector lens 131 by the second contrast for the second spatial frequency on the camera sensor 21 indicated by the MTF characteristic of the camera lens 221. The first spatial frequency on the image display element 121 and the second spatial frequency on the camera sensor 21 have the same spatial frequency on the measurement surface 305 of the three-dimensional shape measurement apparatus 100. Therefore, an error between the third contrast indicated by the synthetic MTF characteristic and the contrast of the stripe pattern on the camera sensor 21 in the actual measurement process is reduced. Thus, the three-dimensional shape measurement apparatus 100 according to the present embodiment can improve the measurement accuracy of the three-dimensional shape.

Moreover, in the three-dimensional shape measurement apparatus 100 according to the present embodiment, cycle candidates are set for all of a plurality of distances between the projector 1 and the measurement target 300. As described above with reference to FIG. 6, reduction in contrast is suppressed by increasing the cycle of the stripe pattern. However, if the cycle is too long, the accuracy of conversion from the phase φ to the height h decreases. Therefore, the shortest cycle in the range of the cycle of the stripe pattern for which the third contrast is equal to or more than a predetermined value is set as a cycle candidate in the three-dimensional shape measurement apparatus 100 according to the present embodiment. Thus, the three-dimensional shape measurement apparatus 100 according to the present embodiment can improve the measurement accuracy of the three-dimensional shape.

Modification 1

In Modification 1, the table 35 associates each of a plurality of cycle candidates with a combination of the distance between the projector 1 and the measurement target 300, the f-number of the projector lens 131, and the f-number of the camera lens 221.

In Modification 1, in the first step of the method of setting the cycle candidate, the MTF characteristic of the projector lens 131 and the MTF characteristic of the camera lens 221 for the combination of the distance between the projector 1 and the measurement target 300, the f-number of the projector lens 131, and the f-number of the camera lens 221 are acquired by an experiment.

In Modification 1, in the second step of the method of setting the cycle candidate, a synthetic MTF characteristic for the combination of the distance between the projector 1 and the measurement target 300, the f-number of the projector lens 131, and the f-number of the camera lens 221 is generated.

In Modification 1, in the third step of the method of setting the cycle candidate, the cycle candidate is set for each of a plurality of combinations of the distance between the projector 1 and the measurement target 300, the f-number of the projector lens 131, and the f-number of the camera lens 221. More specifically, when the cycle candidate for a target combination among a plurality of combinations of the distance between the projector 1 and the measurement target 300, the f-number of the projector lens 131, and the f-number of the camera lens 221 is set, the cycle candidate is set to the shortest cycle in a range of the cycle of the stripe pattern for which the third contrast is equal to or larger than a predetermined value for the synthetic MTF characteristic for the target combination.

The determination unit 351 determines the cycle L of the stripe pattern to be projected on the measurement target 300 by the projector 1, from a plurality of cycle candidates included in the table 35, based on the combination of the distance between the projector 1 and the measurement target 300, the f-number of the projector lens 131, and the f-number of the camera lens 221. Modification 1 is similar to the above-described embodiment in other respects.

Thus, according to Modification 1, the cycle L of the stripe pattern to be projected on the measurement target 300 by the projector 1 is determined to be a cycle based on the combination of the distance between the projector 1 and the measurement target 300, the f-number of the projector lens 131, and the f-number of the camera lens 221. Thus, according to Modification 1, the measurement accuracy of the three-dimensional shape is improved.

Modification 2

Figure 11:
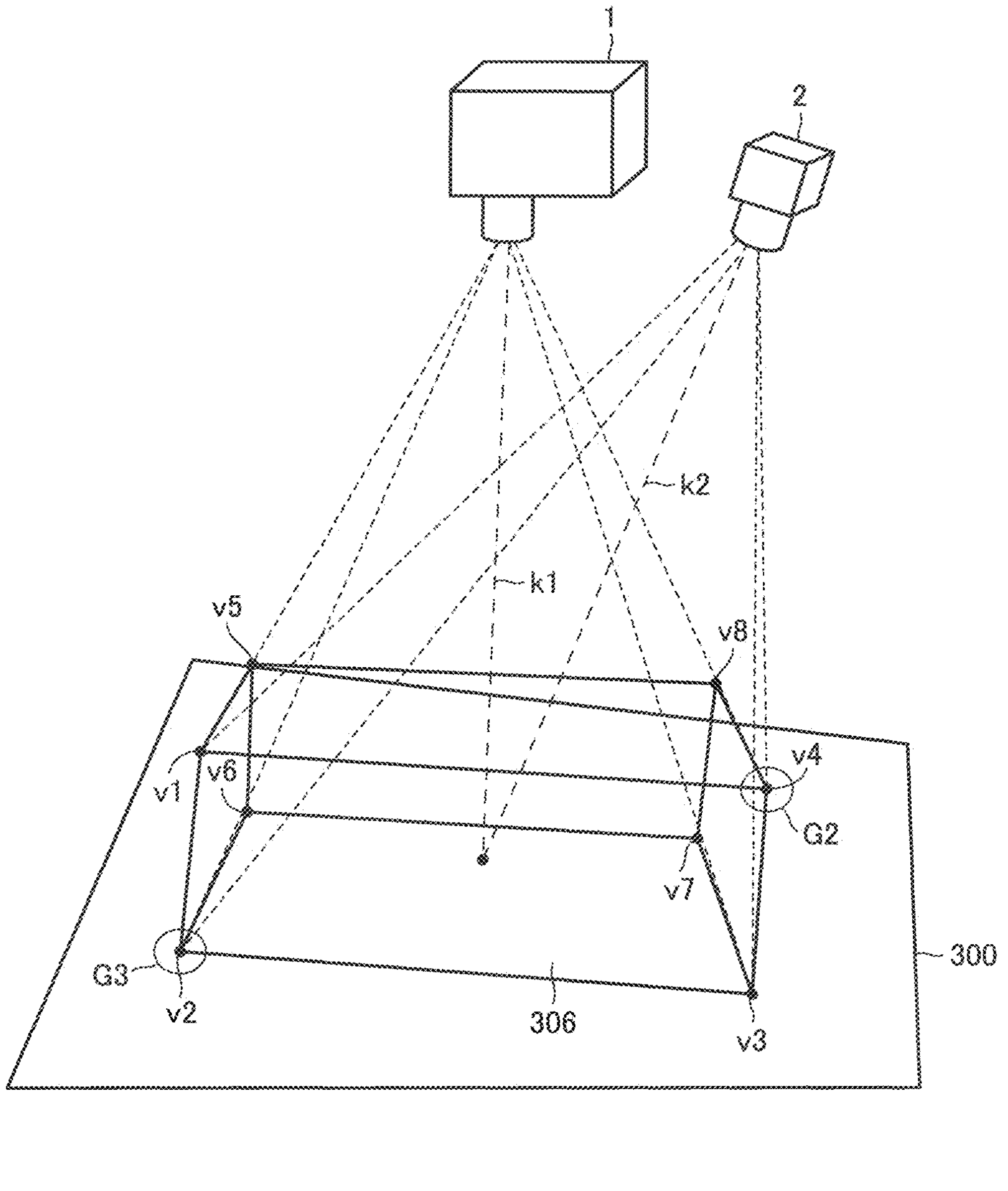
FIG. 11 is a diagram illustrating an MTF characteristic of a projector lens 131 and an MTF characteristic of a camera lens 221 in Modification 2.

FIG. 11 is a diagram illustrating an MTF characteristic of the projector lens 131 and an MTF characteristic of the camera lens 221 in Modification 2.

In general, the contrast of an image of a stripe pattern formed by a lens decreases as the distance from the optical axis of the lens increases. In view of this, in Modification 2, the MTF characteristic of the projector lens 131 corresponds to a first position farthest from the optical axis k1 of the projector lens 131, in a measurement region 306 of the three-dimensional shape measurement apparatus 100. Furthermore, in Modification 2, the MTF characteristic of the camera lens 221 corresponds to a second position farthest from the optical axis k2 of the camera lens 221, in the measurement region 306. The measurement region 306 is a region where the projection range of the projector 1 and the image capturing range of the camera 2 overlap each other. In FIG. 11, the measurement region 306 is a region defined by eight vertices v1 to v8.

In Modification 2, the MTF characteristic of the projector lens 131 for a target distance among a plurality of distances between the projector 1 and the measurement target 300 and the MTF characteristic of the camera lens 221 for the target distance are acquired by the following method of acquiring the MTF characteristic.

The method of acquiring the MTF characteristic in Modification 2 differs from the method of acquiring the MTF characteristic in the above embodiment, in terms of the third step and the sixth step. In the steps other than the third step and the sixth step, the method of acquiring the MTF characteristic in Modification 2 is the same as the method of acquiring the MTF characteristic in the above-described embodiment.

In Modification 2, in the third step of the method of acquiring the MTF characteristic, the contrast is measured in a predetermined region including the first position farthest from the optical axis k1 of the projector lens 131, in the measurement region 306, for each stripe pattern projected on the screen. The first position farthest from the optical axis k1 of the projector lens 131 in the measurement region 306 is, for example, the vertex v4 illustrated in FIG. 11. The predetermined region including the first position is, for example, a region G2 illustrated in FIG. 11. In Modification 2, the contrast measured in this way is used as the first contrast.

In Modification 2, in the sixth step of the method of acquiring the MTF characteristic, the contrast on the camera sensor 21 is measured, for each test chart, for a predetermined region including the second position farthest from the optical axis k2 of the camera lens 221 in the measurement region 306. The second position farthest from the optical axis k2 of the camera lens 221 in the measurement region 306 is, for example, the vertex v2 illustrated in FIG. 11. The predetermined region including the second position is, for example, a region G3 illustrated in FIG. 11. In Modification 2, the contrast measured in this way is used as the second contrast.

Regarding the projector lens 131, the contrast is likely to decrease at the first position in the measurement region 306. Regarding the camera lens 221, the contrast is likely to decrease at the second position in the measurement region 306.

As seen from the above, in Modification 2, the first contrast and the second contrast are different from those of the above embodiment. Modification 2, however, is similar to the above embodiment in other respects.

Therefore, according to Modification 2, the synthetic MTF characteristic is generated by combining the MTF characteristic of the projector lens 131 and the MTF characteristic of the camera lens 221 at positions where the contrast is low in the measurement region 306. Thus, according to Modification 2, the three-dimensional shape measurement apparatus 100 can make the measurement accuracy of the three-dimensional shape equal to or higher than a specified value, at any position in the measurement region 306.

Modification 3

Figure 12:
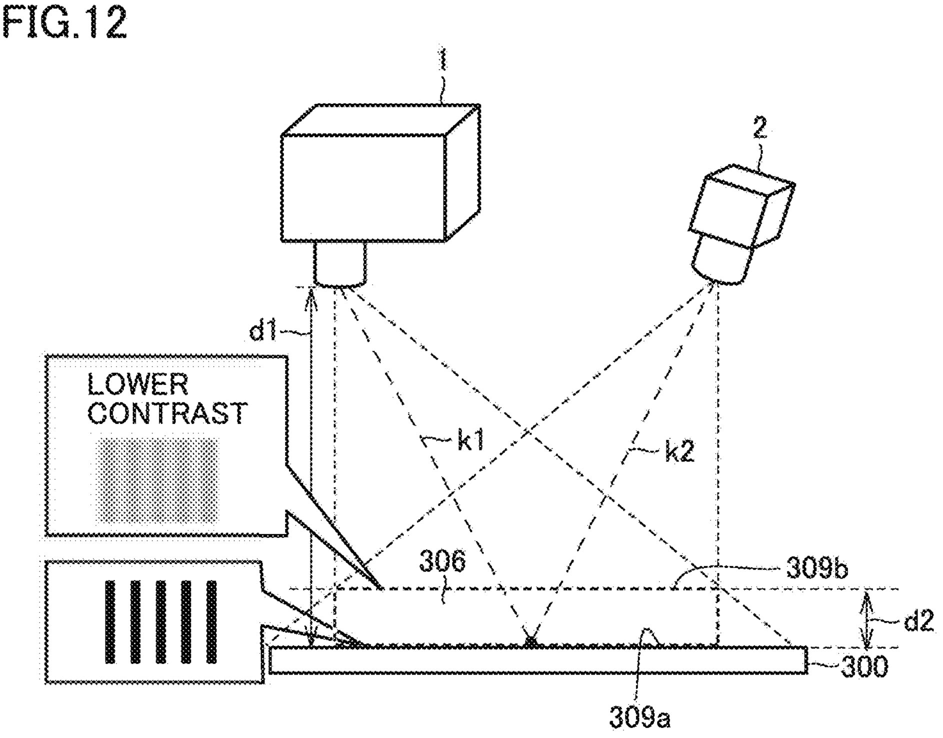
FIG. 12 is a diagram illustrating an MTF characteristic of the projector lens 131 and an MTF characteristic of the camera lens 221 in Modification 3.

FIG. 12 is a diagram illustrating an MTF characteristic of the projector lens 131 and an MTF characteristic of the camera lens 221 in Modification 3.

In general, when the distance d1 between the projector 1 and the measurement target 300 changes in a state where the projector lens 131 is focused on the measurement target 300, the contrast of an image of a stripe pattern formed by the projector lens 131 decreases. That is, in a state where the projector lens 131 is focused on a measurement bottom surface 309*a* of the measurement region 306 of the three-dimensional shape measurement apparatus 100, the contrast of the stripe pattern projected on a measurement top surface 309*b* of the measurement region 306 of the three-dimensional shape measurement apparatus 100 is lower than the contrast of the stripe pattern projected on the measurement bottom surface 309*a*.

When the distance between the camera 2 and the measurement target 300 changes in a state where the camera lens 221 is focused on the measurement target 300, the contrast of an image of a stripe pattern formed by the camera lens 221 decreases.

In view of this, in Modification 3, the MTF characteristic of the projector lens 131 corresponds to the measurement top surface 309*b* of the measurement region 306 in a first state where the projector lens 131 is focused on the measurement bottom surface 309*a* of the measurement region 306 of the three-dimensional shape measurement apparatus 100. Furthermore, in Modification 3, the MTF characteristic of the camera lens 221 corresponds to the measurement top surface 309*b* of the measurement region 306 in a second state where the camera lens 221 is focused on the measurement bottom surface 309*a* of the measurement region 306 of the three-dimensional shape measurement apparatus 100.

In Modification 3, the MTF characteristic of the projector lens 131 for a target distance among a plurality of distances between the projector 1 and the measurement target 300 and the MTF characteristic of the camera lens 221 for the target distance are acquired by the following method of acquiring the MTF characteristic.

In the method of acquiring the MTF characteristic according to Modification 3, step 1A and step 1B described below are added to the method of acquiring the MTF characteristic according to the embodiment described above. Step 1A is performed after the first step of the method of acquiring the MTF characteristic according to the above embodiment.

In step 1A, a height d2 of the measurement region 306 of the three-dimensional shape measurement apparatus 100 is calculated. The height d2 is the distance between the measurement bottom surface 309*a* and the measurement top surface 309*b*. After step 1A, step 1B is performed.

In step 1B, the distance between the projector 1 and the screen is reduced by the height d2 calculated in step 1A. After step 1B, the second step to the seventh step of the method of acquiring the MTF characteristic in the above embodiment are performed.

Thus, Modification 3 differs from the above embodiment in terms of the first contrast and the second contrast. Modification 3, however, is similar to the above embodiment in other respects.

Therefore, according to Modification 3, in a state where the projector lens 131 and the camera lens 221 are focused on the measurement bottom surface 309*a*, the MTF characteristic of the projector lens 131 and the MTF characteristic of the camera lens 221 at the measurement top surface 309*b* located at the farthest position from the measurement bottom surface 309*a* in the measurement region 306 are combined to generate the synthetic MTF characteristic. Thus, according to Modification 3, the three-dimensional shape measurement apparatus 100 can make the measurement accuracy of a three-dimensional shape equal to or higher than a specified value, at any position in the measurement region 306.

Modification 4

While the three-dimensional shape measurement apparatus 100 includes the distance measurement device 4 in the above embodiment, it may not include the distance measurement device 4. In the case where the three-dimensional shape measurement apparatus 100 does not include the distance measurement device 4, a user may input a measurement distance to the three-dimensional shape measurement apparatus 100. In the case where the user inputs the measurement distance to the three-dimensional shape measurement apparatus 100, the processor 31 receives the measurement distance from the user in step S1 in FIG. 10.

Although embodiments of the present invention have been described and illustrated in detail, the disclosed embodiments are made for purposes of illustration and example only and not limitation. The scope of the present invention should be interpreted by terms of the appended claims.

What is claimed is:

1. A three-dimensional shape measurement apparatus comprising:
- a projector that includes a projector lens and projects a stripe pattern;
- a camera that includes a camera lens and captures an image of the stripe pattern projected by the projector to acquire the captured image of the stripe pattern; and
- a hardware processor, wherein
- the hardware processor
  - measures a three-dimensional shape of a measurement target based on the captured image, and
  - determines a cycle of the stripe pattern to be projected by the projector from a plurality of cycle candidates, and
- the cycle candidates are set based on a synthetic MTF (Modulation Transfer Function) characteristic generated by combining a first MTF characteristic of the projector lens and a second MTF characteristic of the camera lens, wherein
- the three-dimensional shape measurement apparatus further comprises:
  - a storage that stores a table in which each of the cycle candidates is associated with a distance between the projector and the measurement target,
  - the synthetic MTF characteristic is generated for each of a plurality of distances between the projector and the measurement target,
  - each cycle candidate of the cycle candidates is set to a cycle for which a contrast of the synthetic MTF characteristic for the distance associated with the cycle candidate is equal to or greater than a predetermined value, and
  - determining the cycle of the stripe pattern includes determining the cycle of the stripe pattern based on a cycle candidate associated with a measurement distance between the projector and the measurement target, among the cycle candidates.

2. The three-dimensional shape measurement apparatus according to claim 1, wherein
- the projector further includes an image display element,
- the camera further includes a camera sensor,
- the first MTF characteristic represents a correlation between a spatial frequency on the image display element and a first contrast representing contrast performance of the projector lens,
- the second MTF characteristic represents a correlation between a spatial frequency on the camera sensor and a second contrast representing contrast performance of the camera lens,
- the synthetic MTF characteristic represents a correlation between the spatial frequency on the image display element and a third contrast,
- the third contrast correlated with a first spatial frequency on the image display element is calculated based on the first contrast correlated with the first spatial frequency on the image display element and the second contrast correlated with a second spatial frequency on the camera sensor, and
- the first spatial frequency on the image display element and the second spatial frequency on the camera sensor have the same spatial frequency on a measurement surface of the three-dimensional shape measurement apparatus.

3. The three-dimensional shape measurement apparatus according to claim 1, wherein the storage stores, in the table, each of the cycle candidates to be associated with a combination of the distance between the projector and the measurement target, an f-number of the projector lens, and an f-number of the camera lens, wherein the synthetic MTF characteristic is generated for each of a plurality of combinations of the distance between the projector and the measurement target, the f-number of the projector lens, and the f-number of the camera lens, each cycle candidate of the cycle candidates is set to a cycle for which a contrast of the synthetic MTF characteristic for the combination associated with the cycle candidate is equal to or greater than a predetermined value, and determining the cycle of the stripe pattern includes determining the cycle of the stripe pattern based on a cycle candidate associated with the combination among the cycle candidates.

4. The three-dimensional shape measurement apparatus according to claim 1, wherein the first MTF characteristic corresponds to a first position farthest from a first optical axis of the projector lens, in a measurement region of the three-dimensional shape measurement apparatus, and the second MTF characteristic corresponds to a second position farthest from a second optical axis of the camera lens, in the measurement region.

5. The three-dimensional shape measurement apparatus according to claim 1, wherein the first MTF characteristic corresponds to a measurement top surface of a measurement region of the three-dimensional shape measurement apparatus in a first state in which the projector lens is focused on a measurement bottom surface of the measurement region, and the second MTF characteristic corresponds to the measurement top surface in a second state in which the camera lens is focused on the measurement bottom surface.

6. The three-dimensional shape measurement apparatus according to claim 1, further comprising a distance measurement device that measures a measurement distance between the projector and the measurement target, wherein determining the cycle of the stripe pattern includes determining the cycle of the stripe pattern from the cycle candidates, based on the measurement distance measured by the distance measurement device.

7. A measurement method for measuring a three-dimensional shape of a measurement target by a three-dimensional shape measurement apparatus, the measurement method comprising:

determining a cycle of a stripe pattern to be projected by a projector including a projector lens, from a plurality of cycle candidates;

projecting the stripe pattern by the projector;

capturing an image of the stripe pattern projected by the projector, by a camera including a camera lens, to acquire the captured image of the stripe pattern; and measuring a three-dimensional shape of the measurement target based on the captured image, wherein the cycle candidates are set based on a synthetic MTF characteristic generated by combining a first MTF characteristic of the projector lens and a second MTF characteristic of the camera lens, the measurement method comprises:

storing a table in which each of the cycle candidates is associated with a distance between the projector and the measurement target, the synthetic MTF characteristic is generated for each of a plurality of distances between the projector and the measurement target, each cycle candidate of the cycle candidates is set to a cycle for which a contrast of the synthetic MTF characteristic for the distance associated with the cycle candidate is equal to or greater than a predetermined value, and determining the cycle of the stripe pattern includes determining the cycle of the stripe pattern based on a cycle candidate associated with a measurement distance between the projector and the measurement target, among the cycle candidates.

8. The measurement method according to claim 7, wherein the projector further includes an image display element, the camera further includes a camera sensor, the first MTF characteristic represents a correlation between a spatial frequency on the image display element and a first contrast representing contrast performance of the projector lens, the second MTF characteristic represents a correlation between a spatial frequency on the camera sensor and a second contrast representing contrast performance of the camera lens, the synthetic MTF characteristic represents a correlation between the spatial frequency on the image display element and a third contrast, the third contrast correlated with a first spatial frequency on the image display element is calculated based on the first contrast correlated with the first spatial frequency on the image display element and the second contrast correlated with a second spatial frequency on the camera sensor, and the first spatial frequency on the image display element and the second spatial frequency on the camera sensor have the same spatial frequency on a measurement surface of the three-dimensional shape measurement apparatus.

9. The measurement method according to claim 7, further comprising storing, in the table, each of the cycle candidates to be associated with a combination of the distance between the projector and the measurement target, an f-number of the projector lens, and an f-number of the camera lens, wherein the synthetic MTF characteristic is generated for each of a plurality of combinations of the distance between the projector and the measurement target, the f-number of the projector lens, and the f-number of the camera lens, each cycle candidate of the cycle candidates is set to a cycle for which a contrast of the synthetic MTF characteristic for the combination associated with the cycle candidate is equal to or greater than a predetermined value, and determining the cycle of the stripe pattern includes determining the cycle of the stripe pattern based on a cycle candidate associated with the combination among the cycle candidates.

10. The measurement method according to claim 7, wherein the first MTF characteristic corresponds to a first position farthest from a first optical axis of the projector lens, in a measurement region of the three-dimensional shape measurement apparatus, and the second MTF characteristic corresponds to a second position farthest from a second optical axis of the camera lens, in the measurement region.

11. The measurement method according to claim 7, wherein the first MTF characteristic corresponds to a measurement top surface of a measurement region of the three-dimensional shape measurement apparatus in a first state in which the projector lens is focused on a measurement bottom surface of the measurement region, and the second MTF characteristic corresponds to the measurement top surface in a second state in which the camera lens is focused on the measurement bottom surface.

12. The measurement method according to claim 7, wherein determining the cycle of the stripe pattern includes determining the cycle of the stripe pattern from the cycle candidates, based on a measurement distance between the projector and the measurement target measured by a distance measurement device.

13. A non-transitory computer-readable recording medium storing a measurement program for causing one or more computers to execute a measurement method for measuring a three-dimensional shape of a measurement target by a three-dimensional shape measurement apparatus, the measurement method comprising:

determining a cycle of a stripe pattern to be projected by a projector including a projector lens, from a plurality of cycle candidates;

projecting the stripe pattern by the projector;

capturing an image of the stripe pattern projected by the projector, by a camera including a camera lens, to acquire the captured image of the stripe pattern; and measuring a three-dimensional shape of the measurement target based on the captured image, wherein the cycle candidates are set based on a synthetic MTF characteristic generated by combining a first MTF characteristic of the projector lens and a second MTF characteristic of the camera lens, the measurement method further comprises:

storing a table in which each of the cycle candidates is associated with a distance between the projector and the measurement target, the synthetic MTF characteristic is generated for each of a plurality of distances between the projector and the measurement target, each cycle candidate of the cycle candidates is set to a cycle for which a contrast of the synthetic MTF characteristic for the distance associated with the cycle candidate is equal to or greater than a predetermined value, and determining the cycle of the stripe pattern includes determining the cycle of the stripe pattern based on a cycle candidate associated with a measurement distance between the projector and the measurement target, among the cycle candidates.

14. The non-transitory computer-readable recording medium according to claim 13, wherein the projector further includes an image display element, the camera further includes a camera sensor, the first MTF characteristic represents a correlation between a spatial frequency on the image display element and a first contrast representing contrast performance of the projector lens, the second MTF characteristic represents a correlation between a spatial frequency on the camera sensor and a second contrast representing contrast performance of the camera lens, the synthetic MTF characteristic represents a correlation between the spatial frequency on the image display element and a third contrast, the third contrast correlated with a first spatial frequency on the image display element is calculated based on the first contrast correlated with the first spatial frequency on the image display element and the second contrast correlated with a second spatial frequency on the camera sensor, and the first spatial frequency on the image display element and the second spatial frequency on the camera sensor have the same spatial frequency on a measurement surface of the three-dimensional shape measurement apparatus.

15. The non-transitory computer-readable recording medium according to claim 13, wherein the measurement method further comprises storing, in the table, each of the cycle candidates to be associated with a combination of the distance between the projector and the measurement target, an f-number of the projector lens, and an f-number of the camera lens, the synthetic MTF characteristic is generated for each of a plurality of combinations of the distance between the projector and the measurement target, the f-number of the projector lens, and the f-number of the camera lens, each cycle candidate of the cycle candidates is set to a cycle for which a contrast of the synthetic MTF characteristic for the combination associated with the cycle candidate is equal to or greater than a predetermined value, and determining the cycle of the stripe pattern includes determining the cycle of the stripe pattern based on a cycle candidate associated with the combination among the cycle candidates.

16. The non-transitory computer-readable recording medium according to claim 13, wherein the first MTF characteristic corresponds to a first position farthest from a first optical axis of the projector lens, in a measurement region of the three-dimensional shape measurement apparatus, and the second MTF characteristic corresponds to a second position farthest from a second optical axis of the camera lens, in the measurement region.

17. The non-transitory computer-readable recording medium according to claim 13, wherein the first MTF characteristic corresponds to a measurement top surface of a measurement region of the three-dimensional shape measurement apparatus in a first state in which the projector lens is focused on a measurement bottom surface of the measurement region, and the second MTF characteristic corresponds to the measurement top surface in a second state in which the camera lens is focused on the measurement bottom surface.

* * * * *